3,284,354
REACTION PRODUCT OF METAL DITHIOPHOSPHATE, POLYAMINE AND ALKENYL SUCCINIC ACID OR ANHYDRIDE
Norman Tunkel, Perth Amboy, and Harold N. Miller, Plainfield, N.J., assignors to Esso Research and Engineering Company, a corporation of Delaware
No Drawing. Filed Dec. 12, 1963, Ser. No. 329,955
8 Claims. (Cl. 252—32.7)

This invention relates to a product obtained by reacting metal dithiophosphate with polyamine to form an adduct, which adduct can be further reacted with alkenylsuccinic anhydride to form a condensation product, methods of preparing said product, and hydrocarbon and lubricating oil compositions which contain said product.

Recently, various nitrogen-containing derivatives of high molecular weight alkenylsuccinic anhydride have become known as sludge dispersants, particularly for lubricating oils. Several of these derivatives are described in U.S. Patents 3,018,247; 3,018,250 and 3,018,291. A particularly effective derivative of this general type can be prepared by condensing alkenylsuccinic anhydride with a polyamine, e.g., tetraethylene pentamine, as described in Australian patent application No. 63,803 filed August 22, 1960. It was further taught in this Australian patent that a combination of metal dithiophosphate with the condensation product of alkenylsuccinic anhydride and tetraethylene pentamine, showed synergy with regard to sludge handling ability and maintaining engine cleanliness. It has now been found that by first reacting polyamine with metal dithiophosphate to form an adduct, and then further reacting this adduct with alkenylsuccinic anhydride, that a single additive material is formed having superior sludge handling ability than said synergistic combination taught by said Australian patent.

Polyamine reactants for the formation of the adduct product of the invention include those of the general formula:

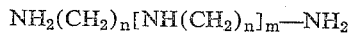

where $n$ is 1 to 5, preferably 2 or 3, and $m$ is 0 to 10, preferably 0 to 4. Specific examples of such polyamines include ethylene diamine, diethylene triamine, triethylene tetraamine, tetraethylene pentamine, octaethylene nonamine, propylene diamine, tetrapropylene pentamine, etc. Also included are N-alkylpiperazines of the formula:

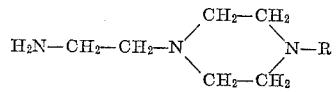

where R is selected from the group consisting of hydrogen, —CH$_2$—CH$_2$—NH$_2$ and

—CH$_2$CH$_2$NH—CH$_2$—CH$_2$—NH$_2$

Metal dithiophosphates reacted with the polyamine to form the adduct include those of the general formula:

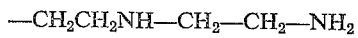

wherein $n$ is the valence of M. R and R' are the same or different radicals of 1 to 30, preferably 2 to 12, carbon atoms each, including radicals such as aryl, alkyl, aralkyl, cycloalkyl, aryloxyalkyl, acylaryl and alkoxyaryl radicals. Preferably, R and R' are hydrocarbon groups and generally will be alkyl groups of 3 to 8 carbon atoms. Usually, the total number of carbon atoms in R and R' will be sufficient that the dithiophosphate per se is soluble in mineral lubricating oil. M can be a metal capable of coordination with amines of Groups II-A to V-A, I-B to VII-B and Group VIII of the Periodic Table described on pages 308-309 of Handbook of Chemistry and Physics, 26th ed., published by Chemical Rubber Publishing Co. of Cleveland, Ohio. Examples of such dithiophosphates include nickel di(2,4-diamyl phenoxyethyl) dithiophosphate; aluminum tri(lauryl phenyl) dithiophosphate; zinc di(methoxyphenol) dithiophosphate; zinc di(amyl) dithiophosphate; cadmium di(dicapryl) dithiophosphate; zinc di(lauryl) dithiophosphate; zinc amyl-butyl dithiophosphate, etc.

The polyamine and the metal dithiophosphate can be complexed together at room temperature. A solvent is usually desirable during this complexing operation because of the large increase in viscosity that generally takes place. Because of the oil-insolubility of the resulting complex, solvents such as chloroform, isopropanol, methylene chloride, ether, etc. can be used for this purpose.

After the complex is formed, it is then reacted with an alkenylsuccinic anhydride or the corresponding acid. However, the alkenylsuccinic anhydride will usually be used since it is very readily prepared by reacting maleic anhydride with an organic compound having a double bond at one end to thereby produce an intermediate compound having the formula:

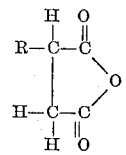

wherein R is an alkenyl radical, either substituted (e.g. chlorinated or sulfurized) or unsubstituted. R will usually contain a total of 30 to 250, preferably 60 to 120, carbon atoms. Because of its ready availability and low cost, R is preferably a polymer of a $C_2$ to $C_5$ monoolefin, having a molecular weight of about 400 to 3000, e.g. about 700 to 2500. Examples of such monoolefins are ethylene, propylene, 1-butene, etc., with a particularly preferred monoolefin being isobutylene.

Particularly preferred is polyisobutenyl succinic anhydride, the preparation of which is described in U.S. Patent 3,018,250, column 3, lines 57-71. While this reaction is conventionally carried out at atmospheric pressure, it has recently been found that carrying out the reaction between maleic anhydride and polyisobutylene at about 450° F. under pressure, that the reaction time can be materially reduced, for example from a typical reaction time of 24 hours to as little as 8 hours reaction time.

The reaction between the alkenylsuccinic anhydride and the complex of polyamine and dithiophosphate can be carried out simply by heating the two materials together while removing the water of condensation and solvent, e.g. chloroform.

The relative ratios of the succinic anhydride, the polyamine, and the metal dithiophosphate can be varied relative to each other over a wide range, depending partly upon the number of amine groups present in the polyamine. A typical ratio that will give good results is obtained by reacting one mole of dithiophosphate with one mole of the polyamine to give an adduct which can be further reacted with one mole of alkenylsuccinic anhydride. The resulting material will provide good wear and oxidation protection and will have good dispersancy. In general, the relative degree of dispersancy appears to be related to the amount of alkenylsuccinic anhydride used, while the antiwear and oxidation stability appears to be related to the proportion of metal dithiophosphate used. Thus, the chemist by varying the amounts of dithiophosphate relative to alkenylsuccinic anhydride, can tailormake the final product to have varying degrees of dispersancy, oxidation inhibition and antiwear properties. Generally, however, within the range of about 0.5 to 2.0 moles of the alkenylsuccinic anhydride and about 0.2 to 4.0 moles of the metal dithiophosphate will be used per mole of the polyamine. Usually, within this range, the desired balance between antiwear and dispersancy properties will be obtained. The exact ratio of reactants is dependent, of course, on the number of amine groups available in the polyamine molecule. Thus, using one mole of polyamine, the total number of moles of alkenylsuccinic anhydride and dithiophosphate that are used should be no greater than the total number of amine groups present. In the case of tetraethylene pentamine, having five amine groups, the total moles of dithiophosphate and alkenylsuccinic anhydride will also be five.

Lubricating oil compositions for crankcase use will comprise a major proportion of lubricating oil, and 0.01 to 20 wt. percent, preferably 0.1 to 10 wt. percent, of the additive of the invention as sludge dispersant, antiwear and antioxidant additive. Oil concentrates may contain 20 to 80 wt. percent of the additive. For use in fuels, such as gasoline and fuel oil, amounts of about .001 to 1.0 wt. percent of the additive will generally be used.

The oil component of the lubricating oil compositions can be a mineral lubricating oil or a synthetic lubricating oil including diesters such as di-2-ethylhexyl sebacate, complex esters, carbonate esters, polysilicones, and other synthetic oils.

The lubricating compositions of the invention can also include conventional lubricating oil additives in amounts of 0.05 to 10.0 wt. percent, usually 0.5 to 4.0 wt. percent each, based on the weight of the total composition. For example, oxidation inhibitors such as phenyl-alpha-naphthylamine; rust inhibitors such as sodium nitrite and lanolin; other dispersants or detergent additives such as basic calcium petroleum sulfonate, phosphosulfurized polyisobutylene, and barium phenate sulfide; viscosity index improvers and pour depressants such as polymethacrylates; dyes; etc. can be used.

*Example 1*

Part A.—A complex of tetraethylene pentamine with zinc dialkyl dithiophosphate was prepared as follows: 100 grams (.53 mole) of tetraethylene pentamine was dissolved in 160 grams of chloroform. To this chloroform solution was then added 990 grams (1.31 moles) of zinc dialkyl (amyl/isobutyl) dithiophosphate in the form of a mineral lubricating oil solution containing 75 wt. percent of said dithiophosphate. The dialkyl groups of this dithiophosphate consisted of about 65% primary amyl groups and about 35 wt. percent primary isobutyl groups. The dithiophosphate was formed by reacting $P_2S_5$ with a mixture of 65 wt. percent amyl alcohol and 35 wt. percent isobutyl alcohol, followed by neutralization with ZnO. After the addition of the dithiophosphate, the resulting solution of the amine-dithiophosphate complex had the appearance of a clear, amber-red, viscous liquid.

Part B.—Polyisobutenylsuccinic anhydride was prepared as follows:

180 pounds of polyisobutylene of 900 molecular weight (Staudinger) was added to a stainless steel reactor containing 22.5 pounds of maleic anhydride. These reactants were then heated at a temperature of about 450° for about 24 hours. The reaction product was then stripped with nitrogen gas for one hour, and filtered through diatomaceous earth. The filtered reaction product was a tacky material of amber color having a saponification number of 96 mg. KOH/gm.

Part C.—The complex of Part A and polyisobutenylsuccinic anhydride of Part B were reacted as follows:

633 grams of the solution of the complex of Part A and 500 grams of the polyisobutenylsuccinic anhydride of Part B were mixed together in a flask equipped with thermometer, stirrer, a condenser and a Dean-Stark water trap. 100 grams of heptane were added as an entraining agent. The resulting mixture was then heated at atmospheric pressure to reflux for about 5 hours, while removing water of condensation until no further water was entrained. 150 grams of mineral lubricating oil was added as a diluent and then the material was blown with nitrogen while at a temperature of about 300° F. in order to remove the remaining entraining agent. At the end of this time, the residue in the flask was cooled. This residue consisted of about 75 wt. percent active ingredient dissolved in about 25 wt. percent mineral lubricating oil. The residue, without further purification, was the product of the invention and was used in the following experiments:

The product of Part C above was then tested for sludge dispersing ability in the ER 4–90 Ford Sludging Test. Prior experience had shown that this Sludging Test gave sludge deposits similar to those obtained in operation of New York City taxicabs. Briefly described, in this test, a Ford 6-cylinder engine is run on a dynamometer stand through a first cycle operating at 500 r.p.m. for 1½ hours, a second cycle operating at 2000 r.p.m. for 2 hours and a third cycle also operating at 2000 r.p.m. for two hours, but at slightly higher radiator water temperature. After completion of the third cycle, the three cycles are repeated over and over again in sequence, until the desired total test time has elapsed. Make-up oil is added as required so that the crankcase oil level at all times is maintained between about 3½ and 4 quarts. The engine is inspected at the end of 66, 110, 154, 200, 242 and 286 hours of operation. This inspection is carried out by disassembling the engine sufficiently to visually examine the following eight parts for sludge:

rocker arm cover
rocker arm assembly
cylinder head
push rod chamber
push rod chamber cover
crankshaft
oil pan
oil screen Each of the first seven parts is visually rated on a numerical scale wherein 10 is perfectly clean and 0 is completely fouled and numbers between 0 and 10 denote varying amounts of deposits. The oil screen is rated as "percent covered with sludge."

*Composition 1.*—A fully formulated crankcase lubricating oil composition containing the product of Part C above was prepared by simple mixing of the following ingredients:

1.9 wt. percent of the product of Part C consisting of 75 wt. percent active ingredient
3.5 wt. percent of detergent-inhibitor
94.6 wt. percent of a mineral lubricating oil having a viscosity of 325 SUS. at 100° F. and a V.I. of 100.

The detergent-inhibitor was a commercial crankcase lubricating oil additive which is a mineral oil solution containing an additive prepared by reacting a mixture of phosphosulfurized polyisobutylene and nonyl phenol with barium hydroxide pentahydrate, followed by blowing with $CO_2$.

*Composition 2.*—A comparison composition was prepared exactly as Composition 1, except that in place of the 1.9 wt. percent of the oil solution of Part C, there was used 0.9 wt. percent of the oil solution containing 75 wt. percent of the zinc dialkyl (amyl/isobutyl) dithiophosphate of Part A and 1.0 wt. percent of a concentrate of succinimide consisting of 75 wt. percent mineral lubricating oil and 25 wt. percent of a succinimide dispersant typified by the formula:

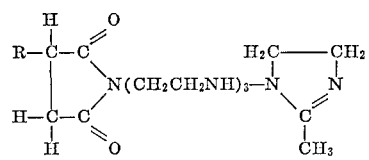

where R was a polyisobutenyl group of about 830 molecular weight, prepared by simultaneously condensing tetraethylene pentamine, polyisobutenyl succinic anhydride and acetic acid. Prior work had showed that the succinimide prepared by simultaneously condensing equimolar amounts of tetraethylene pentamine, polyisobutenyl succinic anhydride and acetic anhydride was a more effective sludge dispersant than a like amount of the succinimide prepared by condensing equal molar amounts of tetraethylene pentamine with the same polyisobutenyl succinic anhydride but without the acetic acid. Thus, while Compositions 1 and 2 differ somewhat in this respect, the comparison of Compositions 1 and 2 for the purpose of showing the increased effectiveness of the product of the invention over the prior art is a valid comparison.

*Composition 3.*—This composition consisted of lubricating oil, 3.5 wt. percent of detergent-inhibitor and 0.9 wt. percent of the oil solution containing 75 wt. percent of the zinc dialkyl (amyl/isobutyl) dithiophosphate of Part A.

Compositions 1, 2 and 3 were tested in the ER 4–90 test previously described and the results obtained are summarized in Table I which follows:

TABLE I.—ER 4-90 SLUDGE TEST

| Test Oil | Sludge Merit/Percent of Oil Screen Covered by Sludge | | | | | |
|---|---|---|---|---|---|---|
| | 66 Hrs. | 110 Hrs. | 154 Hrs. | 198 Hrs. | 242 Hrs. | 286 Hrs. |
| Composition 1 | 9.96/0 | 9.87/0 | 9.8/0 | 9.83/0 | 9.75/0 | 9.66/0 |
| Composition 2 | 9.99/0 | 9.95/0 | 9.93/0 | 9.5/0 | 9.2/0 | 9.2/0 |
| Composition 3 | 9.98/0 | 9.9/0 | 9.2/0 | 7.4/0 | 6.9/5 | 6.7/10 |

The merit results of Table I were an average of the first seven areas of inspection previously described. In all cases with Compositions 1 and 2, no sludge was found on the oil screens. The superiority of Composition 1 of the invention over the related prior art material of Composition 2 becomes apparent at the end of 286 hours, when Composition 1 maintains a merit rating of 9.66 as compared to 9.2 for the comparison Composition 2. 286 test hours in the ER 4–90 test is roughly equivalent to about 9,000 miles of typical driving without an oil change, or about 20,000 to 25,000 miles of taxi-cab type of driving with an oil change about every 3,000 miles. Composition 3 shows the rapid buildup of sludge that occurs without the polyamine product.

As previously indicated, the condensation product of alkenylsuccinic anhydride with the adduct of polyamine and dithiophosphate may also be used in fuels such as gasoline and fuel oil. For example, .005 wt. percent of the product of Part C of Example 1 can be added to gasoline.

As a further illustration of the invention, Example 1 can be repeated except that 1.31 moles of N-alkyl-piperazine of the formula:

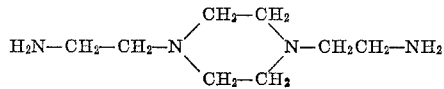

is used in place of the .53 mole of tetraethylene pentamine used in Example 1.

In sum, the invention relates to a mineral-oil soluble reaction product of an adduct of a metal organo dithiophosphate with a polyamine which adduct is then condensed with alkenylsuccinic acid or anhydride. The polyamine will generally contain 2 to 12 amine groups joined by saturated $C_1$ to $C_5$ hydrocarbon groups. Preferably, the amine groups will be joined by ethylene groups. The polyamine may be aliphatic, or constitute a ring, or be a mixture of both the aliphatic and ring type polyamines. The formation of the adduct will normally be carried in a volatile inert solvent capable of dissolving the adduct.

What is claimed is:

1. The mineral-oil-soluble reaction product of (1) an adduct of (A) about 0.2 to 4.0 molar proportions of a metal dihydrocarbon dithiophosphate wherein said hydrocarbon group contains 1 to 30 carbon atoms each, and wherein said metal is a metal capable of coordination with an amine and (B) a molar proportion of a polyamine containing 2 to 12 amine groups separated by saturated $C_1$ to $C_5$ hydrocarbon groups, and (2) about 0.5 to 2.0 molar proportions of an acid material selected from the group consisting of alkenylsuccinc anhydride and alkenylsuccinic acid, per mole of said polyamine, wherein said alkenyl group contains 30 to 250 carbon atoms.

2. The mineral-oil-soluble reaction product of claim 1, wherein said polyamine is of the general formula:

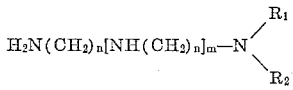

wherein $n$ is 1 to 4, $m$ is 0 to 10, and $R_1$ and $R_2$ are selected from the group consisting of hydrogen and $C_1$ to $C_{10}$ alkyl groups.

3. The mineral-oil-soluble reaction product of claim 1, wherein said dithiophosphate is zinc dialkyl dithiophosphate, said polyamine is tetraethylene pentamine, and said acid material is polyisobutenylsuccinic anhydride wherein said polyisobutenyl group has a molecular weight of about 400 to 3,000.

4. A lubricating oil composition comprising a major amount of lubricating oil and about 0.1 to 20.0 wt. percent of the product of claim 1.

5. An oil concentrate consisting essentially of mineral oil and about 20 to 80 wt. percent of the product of claim 1.

6. A petroleum hydrocarbon composition comprising a major amount of normally liquid petroleum hydrocarbon and about 0.001 to 10.0 wt. percent of the product of claim 1.

7. A method of preparing a product which is soluble in mineral oil and has sludge dispersing properties which comprises mixing about 0.2 to 4.0 molar proportions of metal dihydrocarbon dithiophosphate wherein said dihydrocarbon groups each contain 1 to 30 carbon atoms and wherein said metal is a metal capable of coordination with an amine, with about one molar proportion polyamine in a volatile, inert solvent to form an adduct, and condensing said adduct with about 0.5 to 2.0 molar proportions of an acid material selected from the group consisting of alkenylsuccinic acid and alkenylsuccinic anhydride, wherein said alkenyl group contains 40 to 250 carbon atoms and wherein said polyamine contains 2 to 12 amine groups separated by saturated $C_1$ to $C_5$ hydrocarbon groups.

8. A method according to claim 7, wherein said dithiophosphate is zinc dialkyl dithiophosphate having 3 to 10 carbon atoms per alkyl group, said polyamine is tetraethylene pentamine and said acid material is polyisobutenyl succinic anhydride wherein said polyisobutenyl group has a molecular weight of about 400 to 3000.

References Cited by the Examiner

UNITED STATES PATENTS

| 3,172,892 | 3/1965 | Le Suer et al. | 252—51.5 X |
| 3,185,643 | 5/1965 | Lowe et al. | 252—32.7 |
| 3,185,645 | 5/1965 | Clayton | 252—32.7 X |

DANIEL E. WYMAN, *Primary Examiner.*

P. P. GARVIN, *Assistant Examiner.*